(12) United States Patent
Zhuang et al.

(10) Patent No.: US 7,400,074 B2
(45) Date of Patent: Jul. 15, 2008

(54) COMBINED LOW POWER OIL FILLED SUBMERSIBLE MOTOR AND ITS PROTECTOR

(75) Inventors: Chaorong Zhuang, Tianjin (CN); Zongmin Li, Tianjin (CN); Shudong Dong, Tianjin (CN)

(73) Assignee: Tianjin Rongheng Group, Tianjin (CN)

( * ) Notice: Subject to any disclaimer, the term of this patent is extended or adjusted under 35 U.S.C. 154(b) by 193 days.

(21) Appl. No.: 11/194,210

(22) Filed: Aug. 1, 2005

(65) Prior Publication Data

US 2006/0177320 A1 Aug. 10, 2006

(30) Foreign Application Priority Data

Feb. 6, 2005 (CN) .................... 2005 2 0025274 U

(51) Int. Cl.
*H02K 5/12* (2006.01)
*H02K 5/132* (2006.01)
*F04D 13/06* (2006.01)
*F04D 13/10* (2006.01)

(52) U.S. Cl. .................. 310/87; 417/414; 417/423.3

(58) Field of Classification Search ............. 310/85–87, 310/89; 417/414, 423.14, 423.3, 423.5, 424
See application file for complete search history.

(56) References Cited

U.S. PATENT DOCUMENTS

| 2,219,318 | A | * | 10/1940 | Hoover | 310/87 |
| 3,502,919 | A | * | 3/1970 | Drake et al. | 310/87 |
| 4,350,911 | A | * | 9/1982 | Wilson et al. | 310/87 |
| 4,667,737 | A | * | 5/1987 | Shaw et al. | 166/104 |
| 4,992,689 | A | * | 2/1991 | Bookout | 310/87 |
| 5,367,214 | A | * | 11/1994 | Turner, Jr. | 310/87 |
| 6,307,290 | B1 | * | 10/2001 | Scarsdale | 310/87 |
| 7,066,248 | B2 | * | 6/2006 | Howell | 166/105.5 |
| 2004/0251019 | A1 | * | 12/2004 | Howell | 166/105.5 |
| 2006/0177320 | A1 | * | 8/2006 | Zhuang et al. | 417/414 |

* cited by examiner

*Primary Examiner*—Tran Nguyen
(74) *Attorney, Agent, or Firm*—Law Offices of Albert Wai-Kit Chan, PLLC

(57) ABSTRACT

The present utility model relates to submersible motor and its protector. A shared assembling base is provided to support and fix one end of the housing of the submersible motor and protector, the submersible motor has a main shaft to connect through the protector. The end of the assembling base connecting with the protector has a thrust bearing to support the motor shaft and form a thrust bearing chamber with the seal base of the protector, the shared assembling base has a cooling oil connecting passage, the isolation chamber where the bag is put in is formed between the seal base and assembly head base of the protector, a mechanical seal outside the assembly head base is provided for acting on the main shaft.

3 Claims, 2 Drawing Sheets

COMBINED LOW POWER OIL FILLED SUBMERSIBLE MOTOR AND ITS PROTECTOR

This application claims priority of Chinese Application No. 200520025274.2, filed Feb. 6, 2005. The content of which is hereby incorporated in its entirety by reference into this application.

THE TECHNICAL FIELD

The present utility model relates to the submersible motor, especially relates to a high temperature and pressure resistance combined low power oil filled submersible motor and its protector.

BACKGROUND ART

The existing low power submersible motor and protector with power range 3.1 KW-6.2 KW which conforms to the National Standard of GB/T16750.1~16750.3-1997 is designed with separate structure to be convenient for machining and transportation due to the complicated structure and overlength of the protector and the motor shaft and protector shaft are connected by a coupling while being used. The protector and submersible motor with separate structure also make the different component structure complicated, that is, the submersible motor must have a assembly head base next to the protector, a trust bearing must be set outside of assembly head base to support the shaft and release the axial force; The protector must have an assembly base next to the motor and a seal seat and a center support seat must be set between the assembly head base and assembly base, a thrust bearing must be set on the center support seat to support the transmission shaft and release the axial force, and a mechanical seal which resists sand, impurity and well fluid must independently be set outside of the assembly base and side of the center support seat. As a result of the above the protector is divided into three chambers by the different functional bases. The installation and downhole operating has some difficulty after the transmission shaft of the above protector with complicated structure connects with the main shaft of motor.

Inventive Content

The present utility model relates to low power oil filled submersible motor and its protector with easy installation and operating, which is designed for resolving the technology problem that it's difficult for the above said submersible motor and protector with separate structure to install and operate.

The present utility model uses the following technology: one end of the shared assembling base supports and fixes the motor housing and another end supports and fixes the protector housing, the submersible motor has a main shaft to connect through the protector, the end of the assembling base connecting with the protector has a thrust bearing to support the motor shaft and form a thrust bearing chamber with the seal base of protector, the shared assembling base has a connecting passage for cooling oil to connect the inner chamber of the motor with the chamber of the thrust bearing of the protector the isolation chamber where the bag is put in is formed between the seal base and assembly head base of the protector, a mechanical seal is provided outside the assembly head base for acting on the transmission shaft.

The present utility model also may use the following technical measures:

The housing of the said protector is supported by the shared assembling base and seal base of the protector, the housing is connected with the related base by thread.

The said shared assembling base is connected with the motor housing by an inner end plate at the housing end, the shared assembling base has the bolts to connect with the screw holes on the inner end plate.

The technical effect and advantages of this utility model are: This structure makes the different component parts simplified reasonably, comparing with the separate structure, the submersible motor part omits the thrust bearing, the protector part omits the center support base and the mechanical seal of its side, which makes this combined protector become two chambers structure and make the total length of the protector shortened obviously. The shared assembling base of this combined structure replaces the submersible motor assembly head base and protector assembly base of the separate structure so that the submersible motor and protector become a integrative body by rigid connecting, it's very convenient for transportation and downhole installation and operating. Testing shows that not only every technical criteria of this combined structure conforms to the national standard of GB/T16750.1~16750.3-1997 but also the total length is shortened obviously, taking the product with 60 HZ, 7.5 HP as example, the total length of this combined structure is only 1331 mm and which is 1500 mm shorter than the total length of former separate structure. This utility model has the obvious advantage of simple structure, small body, low cost and easy transportation and operating.

THE DESCRIPTION OF THE DRAWINGS

Figure 1:
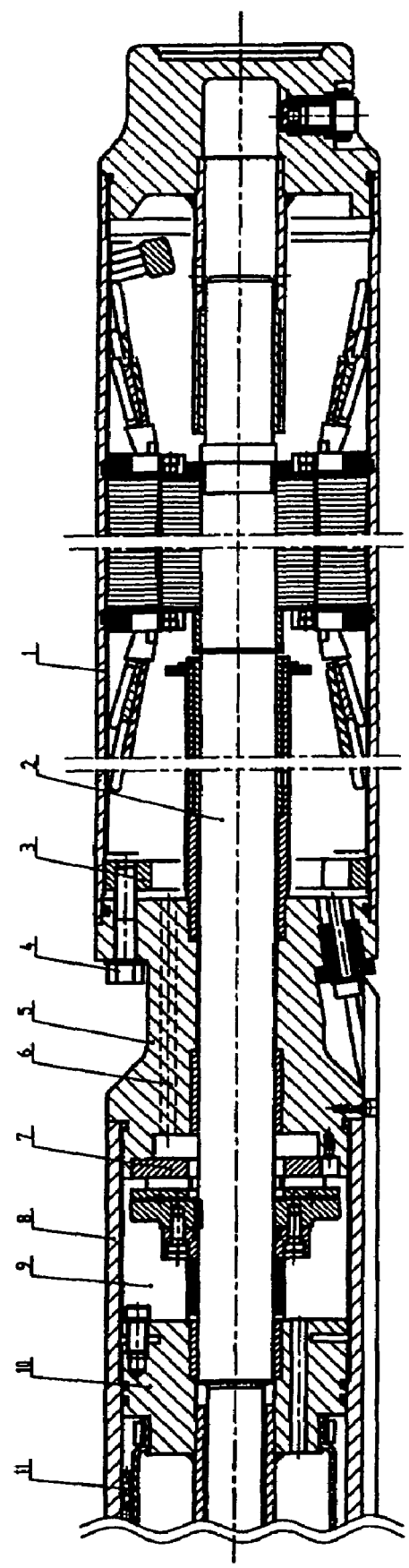
FIG. 1 shows the structural sectional view of the shared assembling base connecting with submersible motor.

THE REFERENCE NUMERALS IN THE DRAWINGS 1. submersible motor housing 2. motor main shaft 3. inner end plate 4. bolt 5. shared assembling base 6. cooling oil connecting passage 7. thrust bearing 8. protector housing 9. thrust bearing chamber 10. seal seat 11. bag 12. isolation chamber 13. assembly head base 14. mechanical seal 15. shipping cap

THE PREFERRED EMBODIMENT

The following is to further explain this utility model by referencing the embodiments and the Figs:

As shown in the FIG. 1, the left end of submersible motor housing 1 is provided with a thread connecting inner end plate 3, the right end of shared assembling base 5 is connected with the screw hole by bolt 4. The submersible motor has a main shaft 2 to connect through the protector.

The shared assembling base 5 is provided with a cooling oil connecting passage 6 (the dotted line in the drawing) which connects the motor inner chamber and protector inner chamber.

Figure 2:
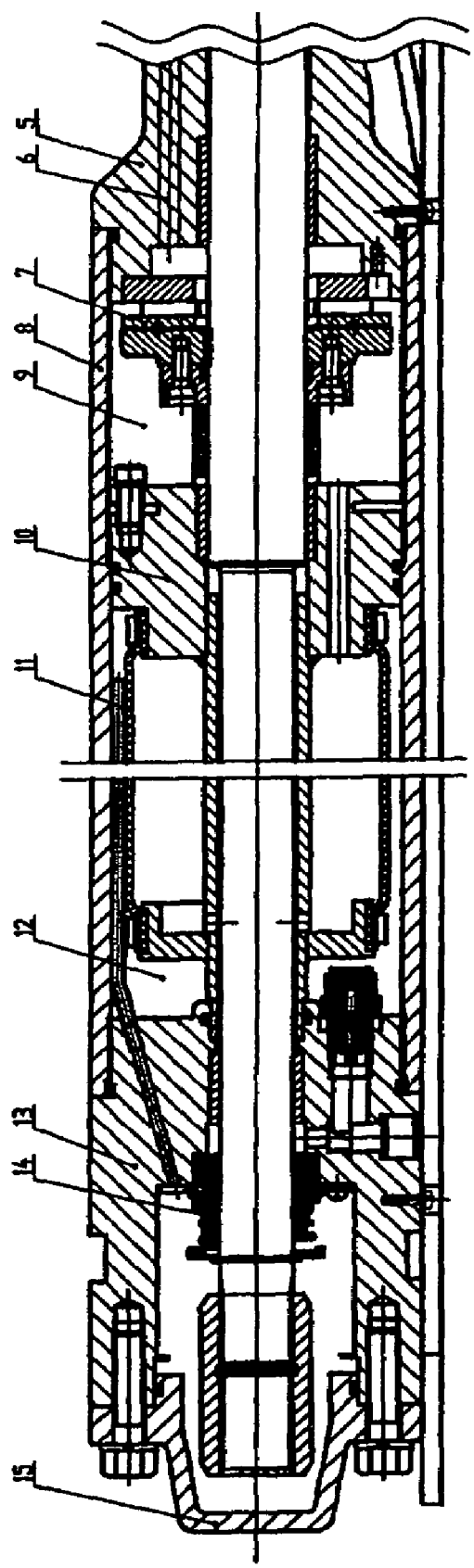
FIG. 2 shows structural sectional view of the shared assembling base connecting with protector.

As shown in FIG. 2, the protector housing 8 is supported and thread fixed by shared assembling base 5 and the assembly head base of protector 13, the end connecting the protector of shared assembling base 5 is provided with a thrust bearing 2 to support the main shaft of motor 2, the thrust bearing chamber 9 is formed between shared assembling base 5 and seal seat 10 of the protector. The protector inner chamber which connects the cooling oil connecting passage 4 is the thrust bearing chamber. The bag 11 is set in the isolation chamber 12 which is formed between the seal seat 10 of protector and assembly head base 13. A mechanical seal 14 is provided outside the protector assembly head base 13 for acting on the motor main shaft 2. Referencing the FIG. 2, a bolt on shipping cap 15 is set outside the assembly head base 13 to protect the transmission shaft 2.

The invention claimed is:

1. A combined low power oil filled submersible motor and its protector, comprising a submersible motor, a protector, and a shared assembling base, wherein the protector comprises an assembly head base, an isolation chamber, a seal seat, and a thrust bearing chamber, wherein a motor housing is fixed to a first end of the shared assembling base, and a protector housing is fixed to a second end of the shared assembling base and a first end of the assembly head base of the protector, wherein the submersible motor has a main shaft that connects through the protector, wherein the thrust bearing chamber is enclosed by the second end of the shared assembling base and a first end of the seal seat, and the shared assembling base is provided with a cooling oil connecting passage that connects a motor inner chamber and the thrust bearing chamber, wherein the isolation chamber is enclosed by a second end of the seal seat and the first end of the assembly head base, and a mechanical seal is provided outside a second end of the assembly head for acting on the main shaft.

2. The combined low power oil filled submersible motor and its protector of claim 1, wherein a bag is provided in the isolation chamber.

3. The combined low power oil filled submersible motor and its protector of claim 1, wherein the motor housing is fixed to the first end of the shared assembling base by an inner end plate of the motor housing.

* * * * *